(12) United States Patent
Quesnelle et al.

(10) Patent No.: US 11,281,637 B2
(45) Date of Patent: Mar. 22, 2022

(54) SYSTEM AND METHOD FOR POLICY BASED MIGRATION USING MTREE REPLICATION WITH DATA PROTECTION APPLICATIONS

(71) Applicant: EMC IP Holding Company LLC, Hopkinton, MA (US)

(72) Inventors: Scott Quesnelle, Burlington (CA); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 169 days.

(21) Appl. No.: 16/717,927

(22) Filed: Dec. 17, 2019

(65) Prior Publication Data

US 2021/0182253 A1 Jun. 17, 2021

(51) Int. Cl.
| | |
|---|---|
| *G06F 16/21* | (2019.01) |
| *G06F 16/27* | (2019.01) |
| *G06F 16/22* | (2019.01) |
| *G06F 16/23* | (2019.01) |
| *G06F 16/25* | (2019.01) |
| *G06F 11/14* | (2006.01) |

(52) U.S. Cl.
CPC ........ *G06F 16/214* (2019.01); *G06F 11/1453* (2013.01); *G06F 16/2246* (2019.01); *G06F 16/2379* (2019.01); *G06F 16/252* (2019.01); *G06F 16/27* (2019.01); *G06F 2201/84* (2013.01)

(58) Field of Classification Search
CPC .... G06F 16/214; G06F 16/27; G06F 16/2379; G06F 16/2246; G06F 16/252
See application file for complete search history.

(56) References Cited

U.S. PATENT DOCUMENTS

| | | | | |
|---|---|---|---|---|
| 2013/0227379 | A1* | 8/2013 | Gupta | H03M 13/09 714/807 |
| 2020/0019468 | A1* | 1/2020 | Chinnam | H04L 61/2007 |
| 2021/0019243 | A1* | 1/2021 | Hickey | G06F 11/1453 |

OTHER PUBLICATIONS

Loshin, Enterprise Knowledge Management 2001, Morgan Kaufmann Imprint, pp. 143-168.*
Tang, CS240—Lecture Notes: Analysis of Algorithms Feb. 13, Cal Poly Pomona, https://www.cpp.edu/~ftang/courses/CS240/lectures/analysis.htm.*

(Continued)

*Primary Examiner* — Jason G Liao
(74) *Attorney, Agent, or Firm* — Staniford Tomita LLP (57) ABSTRACT

Embodiments are described for performing online migration of backup appliances in automated and monitored process from a backup application. The data migration process uses certain Mtree replication methods. It is configured to provide capabilities a backup application server would control, such as Mtree replication configuration from the backup application, a policy driven approach for data center migration, and accommodation of specific customer data recovery needs, and providing a choice to end users for leveraging both Managed File Replication and Mtree replication based on the customer data movement requirements. Such a solution is configured to be generic and applicable to any data protection applications with a policy driven implementation that leverages certain integration points of the system.

20 Claims, 6 Drawing Sheets

(56) References Cited

OTHER PUBLICATIONS

"Special action" data protection Jul. 31, 21, Google, https://www.google.com/search?q=%22special+action%22+data+protection&source=hp&ei=QRIDYcDOLMSI1QG7I5u1Cg&iflsig=AINFCbYAAAAAYQMgUaB5b_KtM4W5uUttfk0YT0Pwi3mr&oq=%22special+action%22+data+protection&gs_lcp=Cgdnd3Mtd2I6EAMyCAghEBYQHRAeMggIIRAWEB0QHjIICCEQFhAdEB4yCAghEBYQHRAeMggIIRAWEB0QHjoFCAAQkQI6BAgAEEM6CwguEIAEELEDEIMBOggILhCxAxCDAToICAAQgAQQsQM6CwgAEIAEELEDEIMBOggILhCABBCxAzoKCAAQsQMQgwEQQzoECC4QQzoOCC4QgAQQsQMQxwEQowI6CAgAELEDEIMBOgsILhCxAxDHARDRAjoKCC4QgAQ6BQgAEIAEOgsILhCABBCxAxCTAjoGCAAQFhAeOggIABAWEAoQHjoHCCEQChCgAToFCCEQqwI6BQghEKABUIgDWN8_YOIBaABwAHgAgAFaiAH9DZIBAjMyMAEAoAEB&sclient=gws-wiz&ved=0ahUKEwiA883qkYnyAhXEUjUKHbvLBqEQ4dUDCAo&uact=5.*

Data Domain Jul. 31, 2001, USPTO, https://tmsearch.uspto.gov/bin/showfield?f=doc&state=4804:qly6g9.2.4.*

McCabe, Computational Microeconomic Experiments and the Study of Exchange [Forecoming]—Posted to SSRN on Aug. 24, 2020] Jul. 9, 2018, SSRN, p. 8.*

Ji et al., Deadline-Aware Scheduling and Routing for Inter-Datacenter Multicast Transfers 2018, IEEE International Conference on Cloud Engineeering, pp. 124-133.*

Luo et al., Deadline-aware fast One-to-Many bulk transfers over inter-datacenter networks Aug. 20, 2019, IEEE Transactions on Cloud Computing, 17 pages.*

* cited by examiner

SYSTEM AND METHOD FOR POLICY BASED MIGRATION USING MTREE REPLICATION WITH DATA PROTECTION APPLICATIONS

TECHNICAL FIELD

Embodiments are generally directed to data protection, and specifically to implementing policy-based data migration using Mtree replication in a deduplicated backup system.

BACKGROUND

Data protection in large-scale enterprises is critical for normal operations. Large-scale backup systems typically employ deduplication backup processes, such as the EMC Data Domain (DD) system, to reduce duplicative copying of backed up data to save disk space. In a deduplication backup system utilizing virtual machines (VMs), each VM runs its own file system, such as a Data Domain Restorer (DDR) or Data Domain File System (DDFS) by EMC Corp., along with other possible applications. In the DDFS (or similar) file system, protocol-specific namespaces are presented to clients/applications for accessing the logical file system layer. Some example protocol namespaces include: Data Domain Virtual Tape Library, Data Domain Boost storage units, and CIFS/NFS fileshares.

Files and directories for each namespace are usually stored in Mtrees, which are user-defined logical partitions of the DDFS that enable more granular management of the file system. Mtree replication enables the creation of copies of Mtrees at secondary locations. In DDFS, the files and directories within Mtrees as well as Mtree snapshots, all reference the same pool of unique segments called a collection, which is made up of log-structured containers that organize the segments on disk to optimize throughput and deduplication effectiveness.

Backing up original data from data sources (such as data center storage) to target storage usually requires the migration of extremely large amounts of data. Purpose built backup appliances (PBBA) have been developed as such data protection target storage. As with any appliance, component replacement and evolving migration needs must be continuously monitored and upgraded. Some platforms, such as Data Domain, have multiple ways to replicate the data from source to target DD. Namely, DD Managed File Replication (MFR), Mtree replication, Collection replication, and Automated Multi Streaming using MFR, among others. Mtree replication allows for entire Mtrees to be replicated, this method matches best with PBBA upgrades and replacements. One main issue with Mtree replication is that the data protection application is unaware of the operation. This means that the data protection application must be offline for this migration, and reconfiguration of the software is necessary to accommodate the migration. Due to the size of the data, this can be a lengthy downtime and force a customer to miss their service level agreements (SLAs). Thus, as the quantity of data on a PBBA continues to expand, and the uptime requirements for the data protection solution increase, offline upgrades are not a good option.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments include systems and methods to perform online migration of backup appliances that can be automated and monitored from a backup application. The data migration process uses certain Mtree replication methods. It is configured to provide capabilities a backup application server would bring under its control. These include Mtree replication configuration from the backup application, a policy driven approach for data migration to accommodate specific customer data recovery needs, and to provide a choice to end users for leveraging both MFR and Mtree replication based on the customer data movement requirements. Such a solution is configured to be generic and applicable to any data protection (DP) applications with a policy driven implementation that leverages certain integration points discussed in greater detail below.

Figure 1:
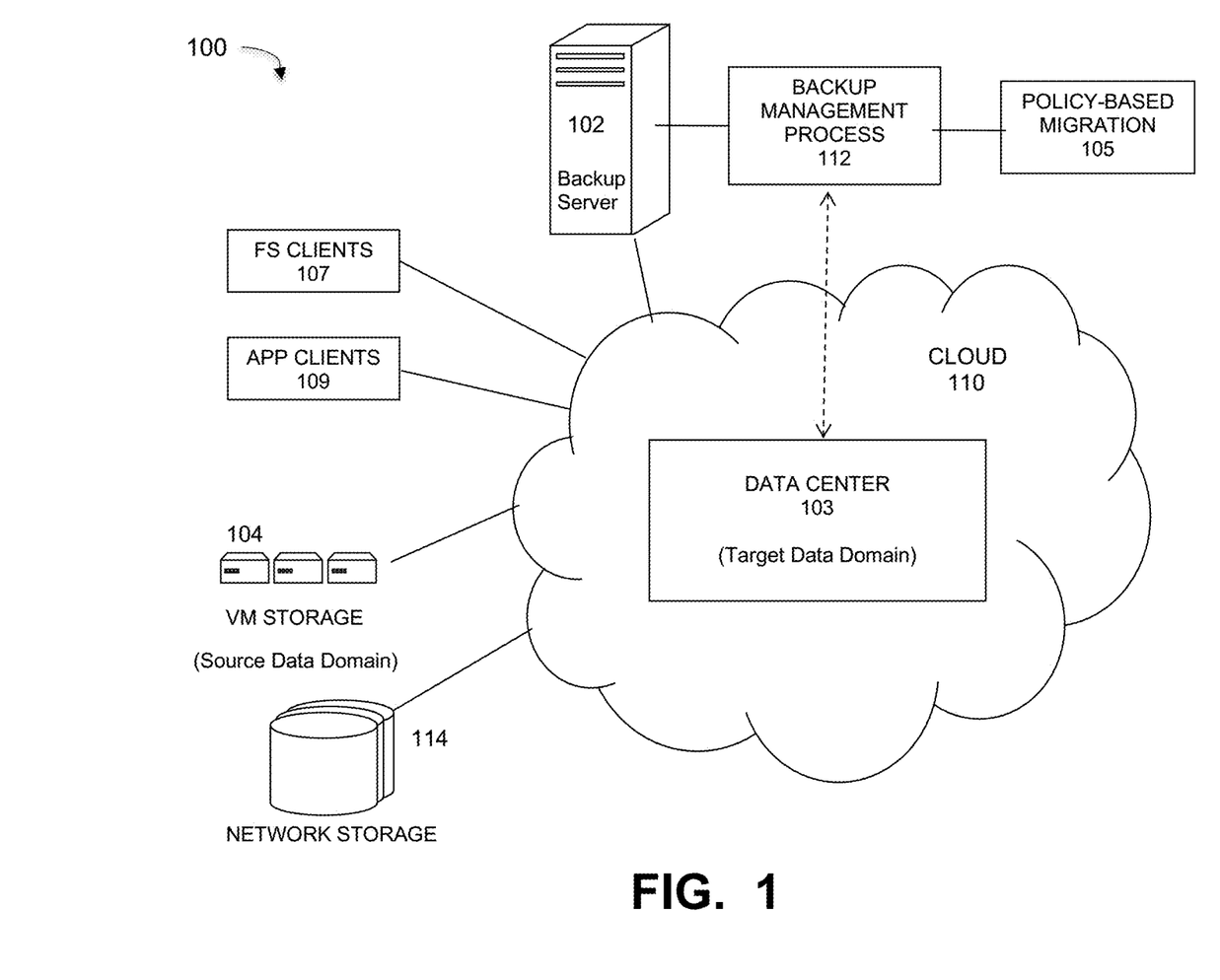
FIG. 1 illustrates a computer network that implements a policy-based migration process using Mtree replication for backup systems, under some embodiments.

FIG. 1 illustrates an overall computer network system that implements a policy-based data migration process using Mtree replication, under some embodiments. System 100 comprises a large-scale network that includes a number of different devices, such as server or client computers 102, data center 103, storage devices 114, and other similar devices or computing resources. Other networks may be included in system 100 including local area network (LAN) or cloud networks and virtual machine (VM) storage 104 or VM clusters. These devices and network resources may be connected to a central network, such as a central or cloud computing network 110 that itself contains a number of different computing resources (e.g., computers, interface devices, and so on). FIG. 1 is intended to be an example of a representative system implementing a data migration process some embodiments, and many other topographies and combinations of network elements are also possible. System 100 can also include other resources, such as file system (FS) clients 107 and/or application (App) clients 109. Such example clients 107 and 109 may also serve as backup sources.

In an example embodiment of system 100, network server 102 is a backup server that executes a deduplication backup process. The deduplication backup process may also be run partially or wholly within a VM, instead or as well. Network server 102 may also be a server computer that supports part or all of the hypervisor functions. In an embodiment, the virtual machines that use or are used as part of the deduplication backup process are implemented as part of a Data Domain (DD) system, though embodiments are not so limited. Data Domain systems present a single, filesystem across all storage to enable ease-of-use and simple management. This single filesystem can be completely or partially exposed as CIFS shares (for Windows), NFS mount points (for Unix/Linux), VTL for open systems and IBMi and/or through advanced integration with Data Domain Boost (for Dell EMC Avamar, Dell EMC Networker, Dell EMC Greenplum, Veritas NetBackup, Veritas Backup Exec, Oracle RMAN and Quest vRanger, and other similar programs). The backup server 102 may be a server running Networker or Avamar data protection software backing up to Data Domain protection storage, such as provided by Dell/EMC' Corporation. However, other similar backup and storage systems are also possible.

For the example network environment 100 of FIG. 1, server 102 is a backup server that executes a backup management process 112 that coordinates or manages the backup of data from one or more data sources. Such data sources may comprise VMs 104, primary network storage 114, and clients 107, 109, among other resources. The data from these data sources (denoted the "source data domain") are protected by backup management process 112 to a protection storage site, such as data center 103 (denoted "Target Data Domain"). For the example shown, the target storage data center 103 is embodied as a Data Domain system, though other implementations are also possible. The data generally resides on clients (107, 109) or VMs 104, so backup software of process 112 protects the data sourced from these clients or VMs. Data within system 100 may be migrated in different possible ways by the backup management process 112. For example, once the source data gets protected to a primary target such as a source Data Domain, it can be replicated to other storage targets such as a target Data Domain 103 or secondary disk storage, and so on. With regard to virtual machines 104, any number of virtual machines (VMs) or groups of VMs (e.g., organized into virtual centers) may be provided to serve as the source of the backed up data.

The target and source data domains shown in FIG. 1 are provided for example only, and any computer or resource in system 100 may act as a source or target for backed up data. Thus, backup sources or appliances may also be included in cloud network 110 or data center 103. Normally operating as a backup target, data center 103 may represent the computing resources running the information technology (IT) system of an organization or enterprise, and which are organized an interconnected in their own network, such as cloud 110. Typical data centers are relatively large-scale data centers that may be distributed around the world, but embodiments are not so limited. Any appropriate scale of intra- and inter-networked computers may be used, such as data centers within a state or region, municipality, or organization (e.g., corporation, school, University, hospital, etc.).

The network or networks of system 100 generally provide connectivity to the various systems, components, and may be implemented using protocols such as Transmission Control Protocol (TCP) and/or Internet Protocol (IP), well known in the relevant arts. In a cloud computing environment, the applications, servers and data are maintained and provided through a centralized cloud computing platform. In an embodiment, parts of system 100 may represent a multitenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 for protection to a target may be stored in any number of persistent storage locations and devices, such as local client or server storage. Storage arrays, such as network storage 114, may at least be partially implemented through disk or memory arrays, such as RAID (redundant array of independent disks) components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system within a data center comprising a server or servers and other clients, and the data may reside on one or more hard drives (e.g., 114) for the database(s) in a variety of formats.

For the embodiment of FIG. 1, backup server also executes a policy-based migration process 105, which may be provided as part of the backup management process 112 or a separate local or network-based application. This process 105 uses certain Mtree replication techniques to implement a policy-based data migration that can be configured to accommodate specific end user data migration requirements, and that prevents or minimizes the effect of offline servicing of purpose built backup appliances in the system. For purposes of description, a backup appliance typically refers to a computer and data storage system that includes both backup software and backup storage to support local disaster recovery on the appliance. In a virtualized embodiment, it may also include a hypervisor to manage VMs of the appliance or accessible over a cloud network.

As shown in FIG. 1, the policy-based migration process 105 is provided or executed by the backup server 102 as part of or along with, the backup management process 112. Alternatively or additionally, parts of the policy-based migration process may be executed by other resources of network 100, such as by a VM in the data center 103 or cloud network 100.

As shown in FIG. 1, one or more aspects of system 100 may be embodied using virtualization technology that allows computer resources to be expanded and shared through the deployment of multiple instances of operating systems and applications that run virtual machines. A virtual machine network is managed by a hypervisor or virtual machine monitor (VMM) program that creates and runs the virtual machines. The server on which a hypervisor runs one or more virtual machines is the host machine, and each virtual machine is a guest machine. The hypervisor presents the guest operating systems with a virtual operating platform and manages the execution of the guest operating systems. Multiple instances of a variety of operating systems may share the virtualized hardware resources. For example, different OS instances (e.g., Linux and Windows) an all run on a single physical computer. In an embodiment, system 100 illustrates a virtualized network in which a hypervisor program supports a number (n) VMs 104. A network server supporting the VMs (e.g., network server 102) represents a host machine and target VMs represent the guest machines. Target VMs may also be organized into one or more virtual data centers or as part of data center 103 representing a physical or virtual network of many virtual machines (VMs), such as on the order of thousands of VMs each. These data centers may be supported by their own servers and hypervisors.

In an embodiment, the virtual machines (e.g., 104) that use or are used as part of the deduplication backup process to either source or store data are implemented as part of a Data Domain Virtual Edition (DDVE) system, though embodiments are not so limited. Such VMs support the Data Domain cloud tier for long term retention, provide multiple replication (e.g., virtual-to-physical, physical-to-virtual, and virtual-to-virtual), and utilize system support for manageability. It should be noted that other similar type of VMs and deduplication systems are also possible.

Figure 2:
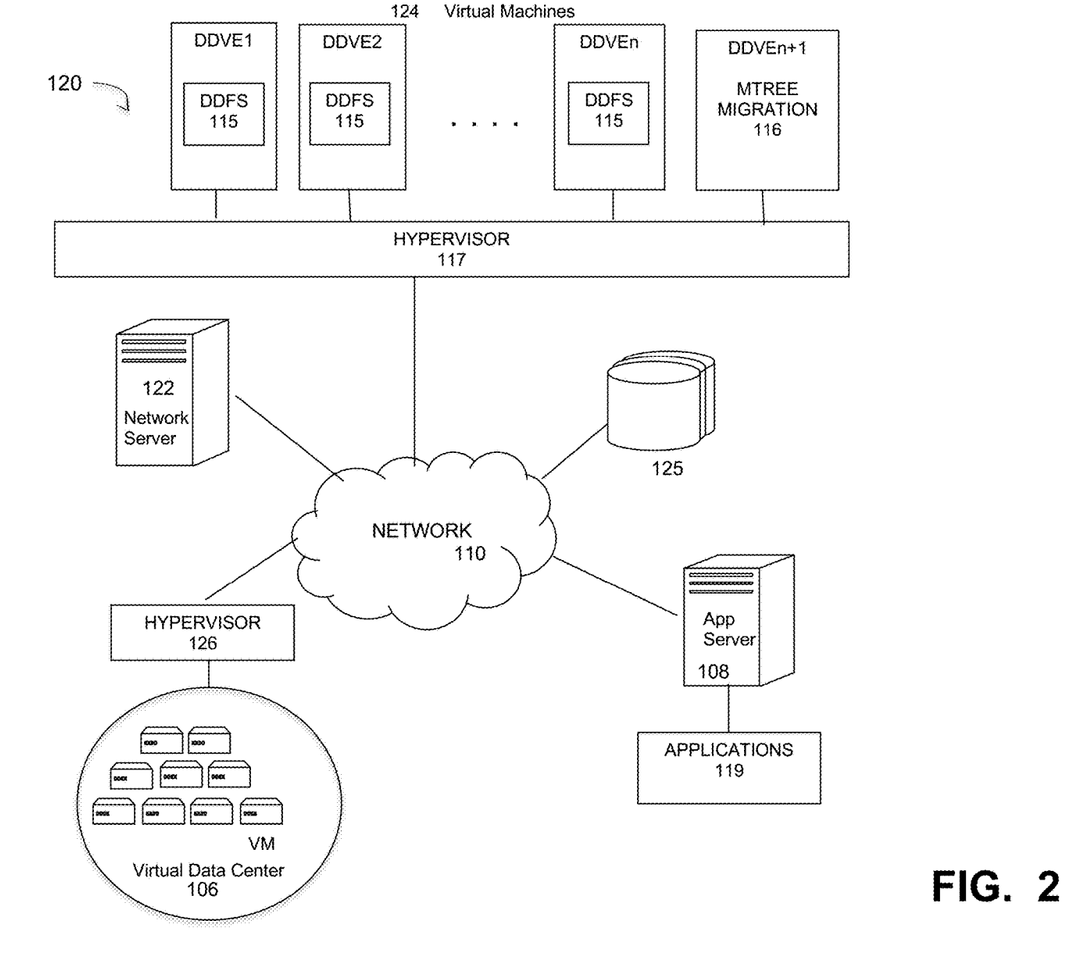
FIG. 2 illustrates a virtual machine computer network that implements an Mtree-based data migration process, under some embodiments.

FIG. 2 illustrates a virtual machine computer network 120 that implements an Mtree-based data migration process, under some embodiments. For the embodiment shown in FIG. 2, each VM, represented as a DDVE (Data Domain Virtual Edition VM) 124 (DDVE1 to DDVEn) runs its own Data Domain File System (DDFS). Each DDVE 124 runs its own DDFS for deduplicating the data from the backup application, along with other possible applications. In the DDFS file system, protocol-specific namespaces are presented to clients/applications for accessing the logical file system layer. Some example protocol namespaces include: Data Domain Virtual Tape Library, Data Domain Boost storage units, and CIFS/NFS fileshares. Files and directories for each namespace are stored in an Mtree, which are user-defined logical partitions of the DDFS that enable more granular management of the file system. Mtree replication enables the creation of copies of Mtrees at secondary locations. In DDFS, the files and directories within Mtrees as well as Mtree snapshots, all reference the same pool of unique segments called a collection, which is made up of log-structured containers that organize the segments on disk to optimize throughput and deduplication effectiveness. Other similar data structures to Mtrees may be used, and embodiments are not so limited.

As shown in FIG. 1, the Mtree migration process may be executed as a server-based process, such as on network server 102, and as part of the policy-based migration process 105. As shown in FIG. 2, it may also or instead be implemented in a virtual machine (e.g., DDVE 124) supported by hypervisor 117. In system 120, network server 122 may be a backup server that executes a deduplication backup process (e.g., process 105). The deduplication backup process may also be run partially or wholly within a VM, as well. Network server 122 may also be a server computer that supports part or all of the hypervisor 117.

The Mtree migration process of VM 116 is configured to facilitate data migration from a data source, such as a VM data center 106 or server 108 running applications 119 that source data for storage on one or more target storage devices, such as network storage 125 and/or VMs in data center 106, or any other target storage media that may be local or remote to system 120. Such VMs may be supported by their own hypervisor 126, as shown.

Mtree Implementation for Deduplication Backup Systems

As stated above, for the system 120 embodiment shown in FIG. 2, each external Data Domain VM 124 (DDVE1 to DDVEn) or internal data center VM runs its own Data Domain File System (DDFS) for a deduplication backup application, along with other possible applications. In DDFS, protocol-specific namespaces are presented to clients/applications for accessing the logical filesystem layer. The files and directories in each Mtree, as well as Mtree snapshots, all reference the same pool of unique segments, called a collection, which is made up of log-structured containers that organize the segments on disk to optimize throughput and deduplication effectiveness. Within a Data Domain system, there are several levels of logical data abstraction above the physical disk storage.

Figure 3:
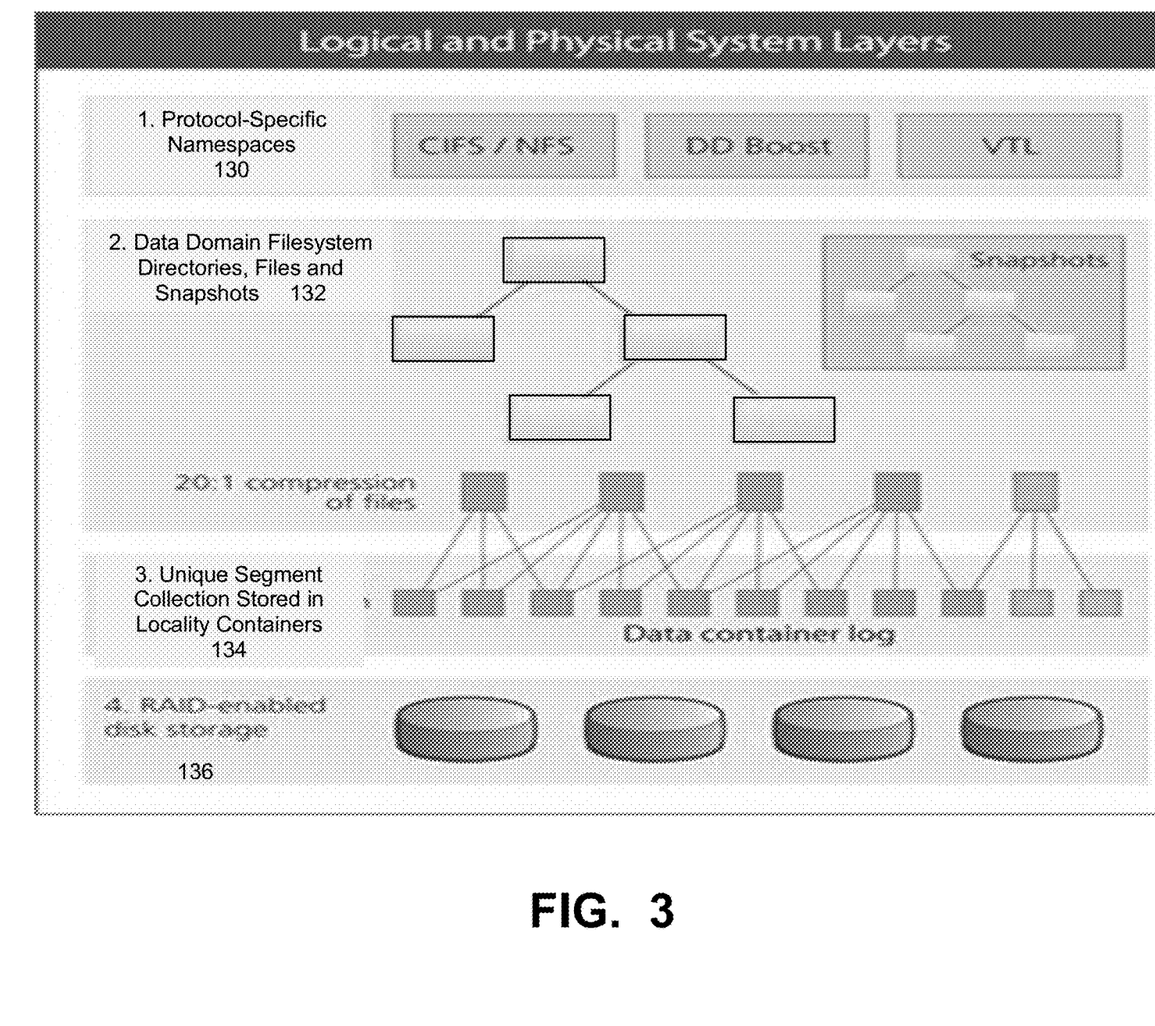
FIG. 3 illustrates levels of data abstraction in a Data Domain system including Mtrees that implement a policy-based data migration method, under some embodiments.

FIG. 3 illustrates levels of data abstraction in a Data Domain system including Mtrees that implement a policy-based data migration method, under some embodiments. As shown in FIG. 3, the Data Domain Operating System (DDOS) filesystem comprises protocol-specific namespaces 130 that provide an external interface to applications, such as CIFS/NFS file shares (over Ethernet), virtual tape libraries (VTL) (over Fibre Channel) and DD Boost storage units (SUs). A Data Domain deployment may use any combination of these simultaneously to store and access data. The filesystem MTrees, directories, files and snapshots layer 132 contain the files and directories for each namespace that are stored in an Mtree in the DDOS filesystem. Mtree snapshots in DDOS are logical and very space-efficient because they share the same underlying data segments. A unique segment collection 134 is stored in locality containers: A 'collection' is the set of files (or virtual tapes) and logical Mtree snapshots. The system identifies and eliminates duplicate segments within each container and then writes compressed deduplicated segments to physical disk. Segments are unique within the collection (not including specific duplicates maintained in DDOS to enable self-healing or fast recovery). Each Data Domain system has a single collection that is stored in a log of segment locality containers. The RAID-enabled disk storage layer 136 comprises a collection containers layer over RAID enabled disk drive blocks to ensure data security and integrity.

An Mtree replication process may be used to replicate MTrees between Data Domain systems and can be used replicating data written via CIFS, NFS, or VTL. Unlike collection replication, Mtree replication offers flexible replication topologies like one-to-one, bidirectional, one-to-many, many-to-one and cascaded. It also offers the flexibility to selectively replicate only a portion of the data written to the source system. Files replicated from the source will land on the destination active tier first regardless if the data is on the active tier or retention tier. This provides the flexibility to the user to set different data movement policies between the source and destination. Managed file replication is used when integrating with applications via Dell EMC Data Domain Boost (e.g. Dell EMC NetWorker, Dell EMC Avamar, Veritas NetBackup, Oracle RMAN, etc.). With managed file replication, backup applications can selectively replicate specific backup images and keep track of all the copies in the application's catalog for easy recovery. Further, the backup application can configure separate retention periods for each copy of the backup image.

Policy Based Data Migration Using MTree Replication

As shown in FIG. 1, system 100 includes a policy based migration process 105 that overcomes certain disadvantages associated with offline upgrades of purpose-built backup appliances (PBBAs). Present data migration steps required during a PBBA upgrade include: (1) starting an outage window for data protection, (2) requiring customer replicate old data to new data, (3) unmounting the old device volume, (4) creating new device on new data center (Data Domain platform) with an existing Mtree, and (5) mounting the volume on the new device. The main disadvantage of using Mtree replication with a data protection application server is that applications of the data source (e.g., application client 109) are not aware about the data path as well as the control path. Users must therefore be cautious about using this feature, which is often loosely coupled with the data protection application running on the backup server.

Embodiments of the data migration process 105 and/or 116 of the backup appliance can be automated and monitored from the backup application 112. This allows the backup application server to control the Mtree replication configuration, as well as implement a policy driven approach for data migration that more closely fits specific user needs.

Figure 4:
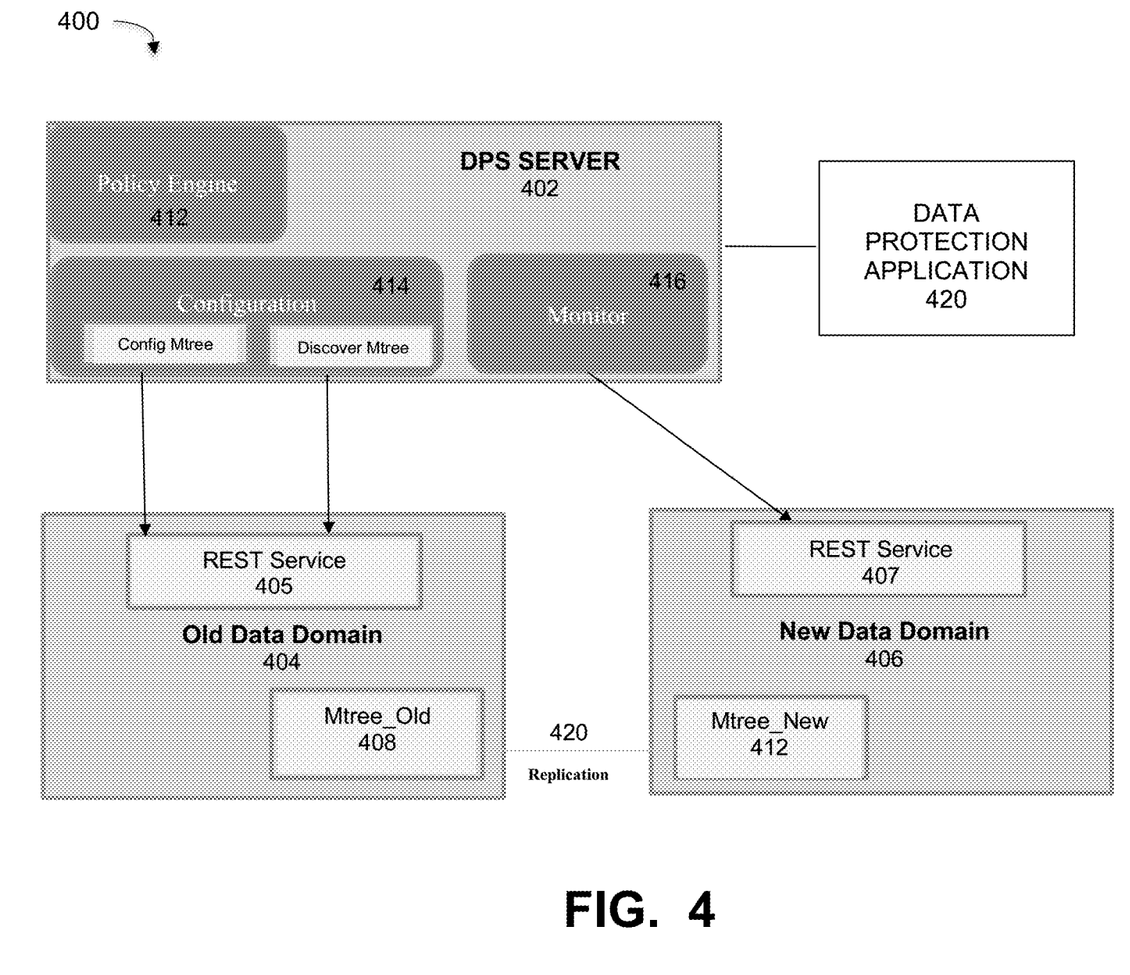
FIG. 4 is a block diagram illustrating a policy-based data migration system using Mtree replication, under some embodiments.

FIG. 4 is a block diagram illustrating a policy-based data migration system using Mtree replication, under some embodiments. In system 400, data protection server (DPS) 402 represents a backup server (e.g., server 102) that executes a data protection (DP) application as part of a backup management process 112. For the embodiment of FIG. 4, the data protection application utilizes REST (Representational State Transfer) APIs (application programming interfaces) on the Data Domain to discover and orchestrate the data protection function. The Data Domain platform uses REST APIs to fulfill customer requirements to automate certain system configurations without needing to rely on user interfaces (UI) and command line interfaces (CLI).

Figure 5:
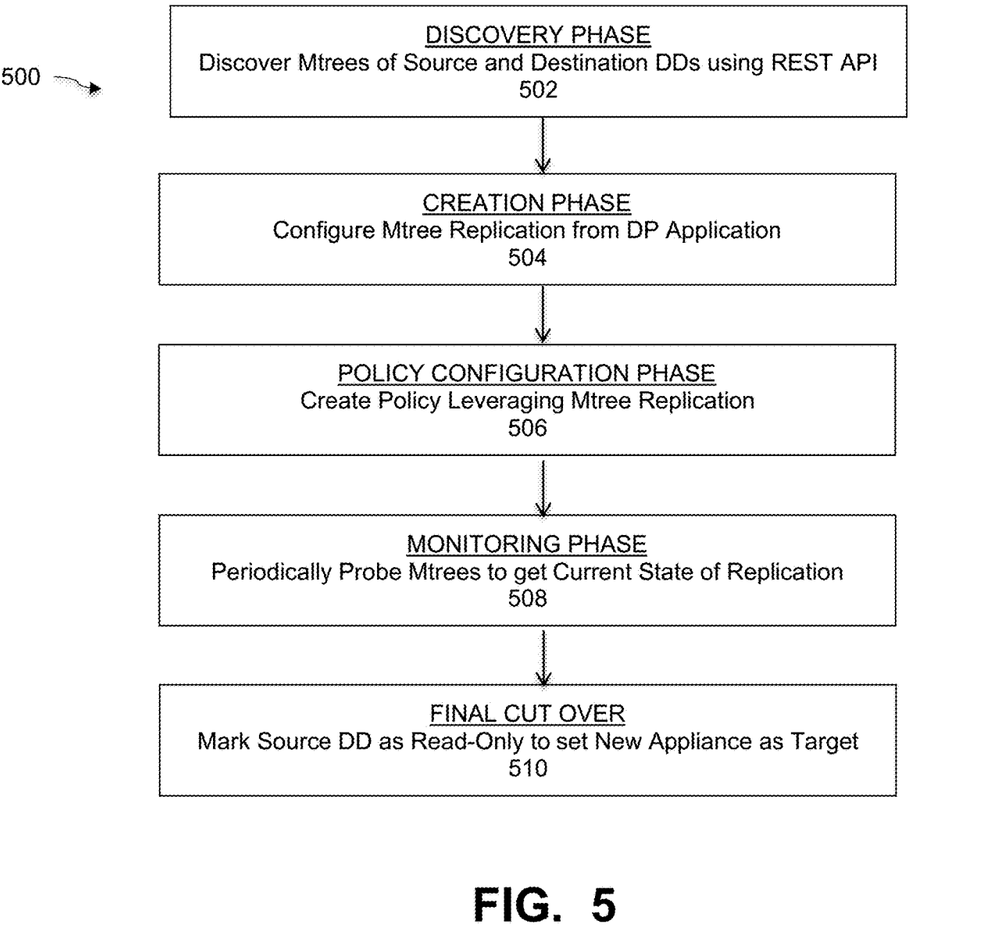
FIG. 5 is a flowchart that illustrates a method of performing policy-based data migration using Mtree replication, under some embodiments.

In general, REST is a software architecture that defines a set of constraints to be used for creating web services. Such web services, called "RESTful web services," provide interoperability between computer systems on the Internet and allow the requesting systems to access and manipulate textual representations of web resources by using a uniform and predefined set of stateless operations. In a RESTful Web service, requests made to a resource's uniform resource identifier (UM) will elicit a response with a payload formatted in a format, such as HTML, XML, or JSON. The response can confirm that some alteration has been made to the stored resource, and the response can provide hypertext links to other related resources or collections of resources. The stateless aspect is achieved by the fact that the client-server communication is constrained by no client context being stored on the server between requests. Each request from any client contains all the information necessary to service the request, and the session state is held in the client. The client begins sending requests when it is ready to make the transition to a new state. While one or more requests are outstanding, the client is in transition. The representation of each application state contains links that can be used the next time the client chooses to initiate a new state-transition As shown in FIG. 5, the DPS server 402 executes a data protection application that is configured to initiate data copying, replication, or migration operations 420 from a source to a target through data backup processes. Such an application can be invoked upon a specific need, or based upon a set backup schedule. DPS server 402 also includes several components including a policy engine 412, a configuration component 414, and monitor component 416. The policy engine 412 implements certain policies defined by the administrator and/or the user to dictate certain rules controlling the data migration. Such policy rules can include data sources and targets, backup time windows, minimum or maximum data transfer rates, and other similar parameters.

The DPS server 402 controls the migration or replication 420 of data from an old data domain (source DD) 404 to a new data domain (target DD) 406. The data is contained in the form of respective Mtrees 408 and 412. The configuration component 414 of DPS server 402 executes a configure Mtree process and a discover Mtree process to find the Mtree (Mtree_old) 408 of the source (old) Data Domain 404. The replication process 420 copies the data to the target (new) Data Domain 406 and creates the new Mtree (Mtree_New)

for the new Data Domain. The monitor component 416 monitors the DP process to obtain the status of the Mtree replication from old to new and displays the progress through a graphical user interface (GUI). For the embodiment of FIG. 4, the configuration component 414 and monitor component 416 interact with the old Data Domain 404 through REST service 405, and the monitor component 416 interacts with the new Data Domain 406 through REST service 407. Alternatively, other interfaces may be used to communicate between the DPS server 402 and the old and new DD domains 404 and 406.

In an embodiment, the policy engine 412 will have a specific action for Data Domain migration. Such an action could be denoted "DD Migration" and/or "DR saveset migration". During configuration of these actions, the engine automatically lists the set of pairs already created for DDRs by listing the pair name along with the source and destination DDRs. The action creation would be within the Data Protection server CRUD operation scope and the engine does not necessarily need to interact with actual DDRs. The action would be scheduled to run at particular schedule or on demand. Once an action gets started, it would validate the source and destination DD connectivity before triggering the Mtree replication. If the Data Domains can be communicated, the action starts the Mtree replication via the REST interface 405. The monitoring of the Mtree replication operation by monitor 416 would be a periodic check from the source and destination DDRs. The errors/failures, if any, during Mtree replication would be displayed on the Data Protection software server and appropriate action would be marked as failed. There can be a specific scope defined for the "DD Migration" action and "DR saveset migration" action type.

FIG. 4 illustrates the three main actors in the policy-based data migration process, which are the data protection application 420, the source data domain 404 and the destination or target data domain 406. The source DD is generally a backup appliance that would be decommissioned, but that has backup data to be saved. In an embodiment, the DP application 420 initiates the replication process 420 upon a need to update, modify, fix, or otherwise take offline the source DD. This offline procedure is referred to as "decommissioning" the source. The source DD can be brought back online after its decommissioning in a separate recovery operation, or it may be permanently removed from the system. This decommissioning process can be performed on an as-needed basis, or it can be performed as a scheduled event for each PBBA of the system. As described in greater detail below, the DP application 420 uses REST APIs on the Data Domain platform to discover and orchestrate the data migration in a series of discrete phases.

FIG. 5 is a flowchart that illustrates a method of performing policy-based migration using Mtree replication, under some embodiments. The overall flow diagram of FIG. 5 shows the main phases of such a data migration process. Process 500 of FIG. 5 begins with a discovery phase 502 the comprises the discovery of Mtrees by querying the source and destination Data Domain systems and their management credentials by using the REST API. Next is the creation phase 504, in which the process leverages the Data Domain REST API to configure the Mtree replication from the data protection application. This phase adds some metadata into the Mtree replication pair-specific resource on the Data Domain system that would help to identify data protection application and avoid unnecessary tampering from the Data Domain side, such as abnormal deletion of pair without realizing that it was created by backup application. In an embodiment, the metadata comprises tags that are added into the replication pair to indicate that the tag is owned by the backup application.

In an embodiment, a replication pair comprises a data source and a target, as identified by their respective identifiers. This pair may be defined by the backup process 112 itself, or it may be explicitly specified by an administrator or agent during the backup operation. This pair would be created by backup application using REST API service from Data Domain. The backup application would also add a tag for a specific backup application to distinguish this pair from replication pairs created on the Data Domain. The tag would help Data Domain administrators recognize on the DD UI that this pair was created by the specific application and is being used, and could potentially avoid any abnormal operation (such as deletion).

In the policy configuration phase 506, the data protection (backup) server creates a policy with two special action types such as "DD Migration" and/or "DR Savesets." These actions leverage the Mtree replication from the Data Domain to synchronize the data. Next is the monitoring phase 508, in which the data protection server periodically probes the Mtrees that are getting replicated and displays the status through the backup application. This can be achieved using REST APIs by periodically fetching the progress the data migration process. The last phase is final cut over 510, in which the old PBBA is marked as read-only and the new appliance becomes the main target for backups. Details of each phase of process 500 are explained below.

With respect to the discovery phase 502, and with reference to system 400 of FIG. 4, the DPS server 402 leverages the REST interface 405 to interact with the source Data Domain (old DD 404) and query its resources to obtain its list of Mtrees. This mechanism takes advantage of the REST interface to query the DD Mtrees once the valid credentials are supplied and authenticated with the Data Domain. The data protection software will list all the Mtrees within the Data Domain to form the Mtree_Old 408 data structure. Given the source and destination DDRs, the DP server 402 queries the list of Mtrees and list in its UI/CLI. The data protection software will have a Data Domain as a resource type and the list of Mtrees will be part of that resource. The Mtree list is thus acquired through the REST interface. During the discovery phase, the backup server queries the Mtree from the Data Domain and selects them during creation of the Mtree replication pair.

With respect to the creation phase 504, the data protection server 402 will provide a capability to create a Mtree replication pair from the UI/CLI. Once the discovery phase 502 lists all the Mtrees for the source (old) DDRs, the server 402 will list the options that support the Mtree replication capabilities. For example, the data protection software would enable the capability such as "Create Pair", "Enable Pair", "Disable Pair", "Delete Pair". These capabilities would be similar to CRUD operation on Mtree using REST from DP server, where a CRUD (create, read, update, delete) operation are four primitive database operations that map well to the HTTP verbs most frequently used in REST: Create (SQL INSERT) POST—used to support the creation of a child resource, but that can also modify the underlying state of a system. Mtree replication settings (such as optimized WAN latency etc.) could be abstracted from the user to avoid confusions, however, the data protection server would pass the default properties that are necessary for Mtree replication pair creation via the CRUD operation. The Mtree replication pair can be one-to-one or one-to-many. The data protection server 402 can also pass a tag to support and recognize that, this Mtree pair is created by a specific DP application. This way, DD/BA/DBA administrators could recognize through the DD UI that a specific pair is created by a specific application and is being used and could potentially avoid any abnormal operation (such as deletion).

Once the Mtree replication pair gets created, it would be updated in a resource configuration database on the data protection server 402 as separate resource with the source DDR and destination DDR names, and specific tag information. The mirrored Mtree copy will be automatically discovered by the data protection server to mark it as replication pair for a specific Mtree on the source DDR and it would be shown as read-only copy. If there are any devices created on the source DDR, those would all be reflected on a secondary Mtree mirror copy DDR that can be just configured on the server. This mirror copy would share the same device access information (to access the path to device on Mtree), however it will also be a read-only copy. This mechanism would help in use cases such as "Disaster recovery from secondary DDR within same data center," "Recovering from secondary DDR on remote DC," "DD Migration" thru Mtree replication," and the like. This would also enable the volume being created on source Mtree, which can be used for R/W operation, to be simultaneously made available as a mirror copy (in the form of volume sharing) on the secondary DDR.

The policy configuration phase 506 creates and configures defined policies that leverage the Mtree replication. One of the important features of data management is a policy driven approach, and present backup systems generally lack the capability of Mtree replication through defined policies. Embodiments overcome this shortcoming by providing a special action type added into the policy configuration 506. Such an action could be "DD Migration" and/or "DR saveset migration," or similar. During configuration of these actions, the process would automatically list the set of pairs already created for DDRs by listing the pair name along with source and destination DDRs. The action creation would be within the data protection server CRUD operation scope and it does not necessarily need to interact with actual DDRs. The action would be scheduled to run in accordance with a particular defined schedule or on-demand. Once the action is started, it would validate the source and destination Data Domain connectivity before triggering the Mtree replication process. If the Data Domains can be communicated, then it would start the Mtree replication via REST interface. The monitoring component 416 periodically checks the data migration from the source to the destination DDR. Any errors/failures during Mtree replication would be displayed by the data protection server and the appropriate action would be marked as failed. There can be a specific scope defined for "DD Migration" action and "DR saveset migration" action types.

With respect to the monitoring phase 508, as described above, once the Mtree replication is started by a specific policy or action, the DP server 402 will probe the source and destination DDRs. During monitoring, data protection server issues a periodic REST query to the source DDRs to get the status of the Mtree replication and display the progress under specific tab under a monitoring window of the GUI. The monitoring window could have a Data Domain migration action specific tab in the UI that could be leveraged to monitor the progress of DD Mtree replication. This monitoring function is performed by monitor component 416 of DP server 402.

The final cut over phase 510 is invoked once the replication is complete between the source and destination DDRs, and the data has been fully synchronized between the two hosts. The data protection application enables the new DDR as the backup target and disables creation of any new backups on the old DDR. A final check is then performed to ensure that there is no data needed to be migrated from the old DDR, and once complete the user would be notified that the old DDR is ready for decommissioning.

The automated and monitored approach to data migration as illustrated in FIG. 5 eliminates the need for backup application downtime in the event that the source is a PBBA that needs to be taken offline for service. The backup application is made aware that the data migration is underway, thus allowing it to better allocate sessions to the device during this period. This is accomplished through the metadata tag mechanism that is added into the replication pair.

System Implementation

Figure 6:
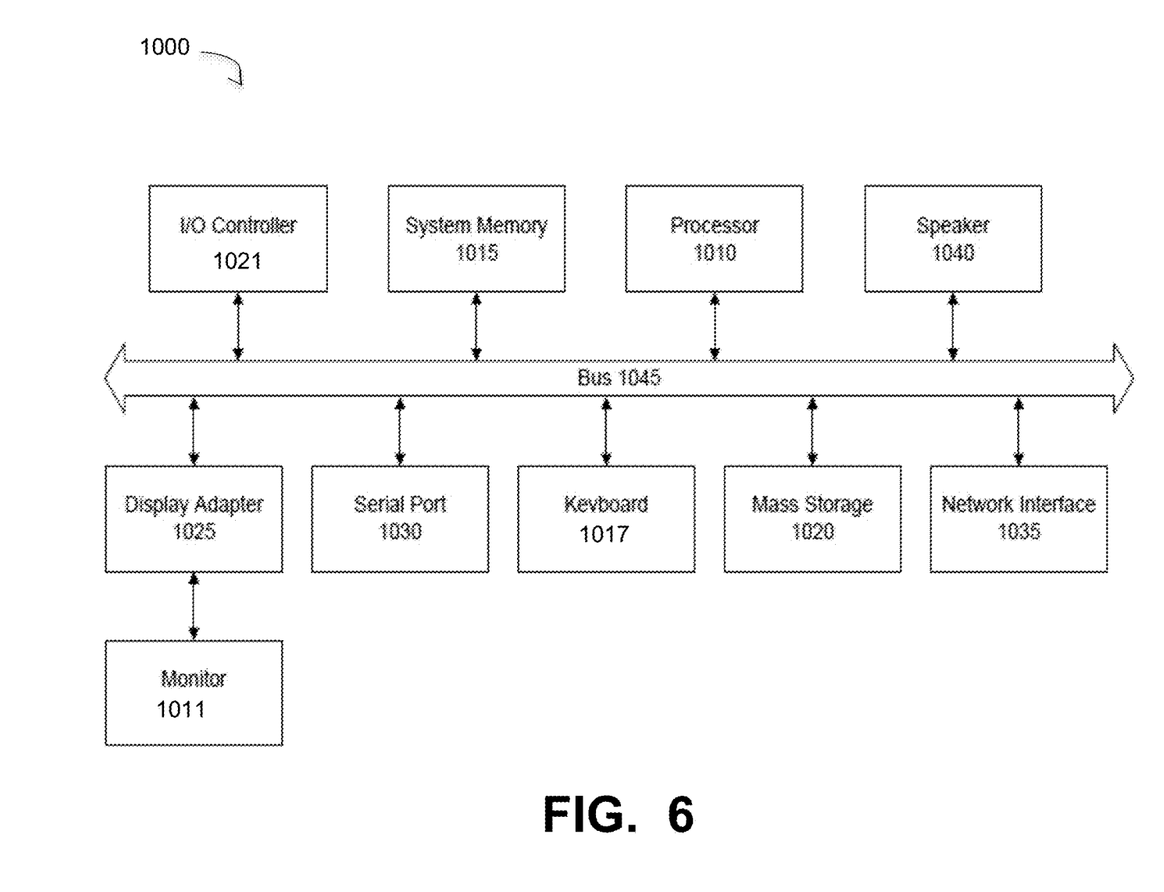
FIG. 6 is a block diagram of a computer system used to execute one or more software components of a policy-based data migration process for backup applications, under some embodiments.

FIG. 6 is a block diagram of a computer system used to execute one or more software components of a policy-based data migration using Mtree replication process, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 6 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific order flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of performing, in a data protection (DP) application executed by a data protection server, policy-based data migration from a source to a destination using Mtree replication, comprising:
   discovering source data organized into Mtrees on the source by querying the source and destination to receive valid credentials from each of the source and destination;
   creating an Mtree replication pair from the DP application comprising the source and destination;
   configuring a policy to control the Mtree replication by validating source and destination connectivity before initiating the Mtree replication;
   monitoring the Mtree replication periodically to obtain a status of the Mtree replication; and
   checking, once the Mtree replication is complete, that there is no further source data to be migrated to the destination.

2. The method of claim 1 wherein the source comprises a backup appliance to be taken offline for service, the method further comprising:
   marking the source as a read-only source; and
   designating the destination as a main target for future data backups.

3. The method of claim 1 further comprising using a REST interface to communicate between the data protection application and the source and destination to discover the Mtrees and configure the Mtree replication.

4. The method of claim 3 wherein the configuring step uses operations including: Create Pair, Enable Pair, Disable Pair, and Delete Pair, to create the Mtree replication pair.

5. The method of claim 4 further comprising, upon creating the Mtree replication pair, updating a resource configuration database on the data protection server executing the data protection application to include a source name, a destination name, and tag information.

6. The method of claim 5 wherein the tag is passed from the data protection server to indicate that the Mtree replication pair was created by the data protection application.

7. The method of claim 6 further comprising displaying, through a graphical user interface of the data protection server, output of the monitoring step to the administrators.

8. The method of claim 1 wherein the configuring step creates a policy uses the Mtree replication to synchronize the data during the data transmission.

9. The method of claim 1 wherein the data protection server is part of a deduplication backup system.

10. The method of claim 9 wherein the Mtree stores files and directories in a respective node in the deduplication backup system, and wherein the Mtree comprises user-defined logical partitions of a file system of the deduplication backup system.

11. A system having a data protection (DP) application executed by a data protection server, policy-based data migration from a source to a destination using Mtree replication, and comprising:
   a configuration hardware component discovering source data organized into Mtrees on the source by querying the source and destination to receive valid credentials from each of the source and destination, and creating an Mtree replication pair from the data protection application comprising the source and destination;
   a policy hardware component operating through the configuration component and configuring a policy to control the Mtree replication by validating source and destination connectivity before initiating the Mtree replication; and
   a processor-based monitor monitoring the Mtree replication periodically to obtain a status of the Mtree replication and checking, once the Mtree replication is complete, that there is no further source data to be migrated to the destination.

12. The system of claim 11 wherein the source comprises a backup appliance to be taken offline for service, the configuration hardware component further marking the source as a read-only source, and designating the destination as a main target for future data backups.

13. The system of claim 11 further comprising using a REST interface to communicate between the data protection application and the source and destination to discover the Mtrees and configure the Mtree replication.

14. The system of claim 12 wherein the configuration hardware component uses operations including: Create Pair, Enable Pair, Disable Pair, and Delete Pair, to create the Mtree replication pair.

15. The system of claim 14 further comprising a resource configuration database on the data protection server executing the data protection application to include a source name, a destination name, and tag information.

16. The system of claim 15 wherein the tag is passed from the data protection server to indicate that the Mtree replication pair was created by the data protection application.

17. The system of claim 16 further comprising a graphical user interface component of the data protection server displaying an output of the monitoring step to the administrators.

18. The system of claim 11 wherein the configuration hardware component creates a policy that uses the Mtree replication to synchronize the data during the data transmission.

19. The system of claim 11 wherein the data protection server is part of a deduplication backup system, and wherein the Mtree stores files and directories in a respective node in the deduplication backup system, and further wherein the Mtree comprises user-defined logical partitions of a file system of the deduplication backup system.

20. A computer program product, comprising a non-transitory computer-readable medium having a computer-readable program code embodied therein, the computer-readable program code adapted to be executed by one or more processors to implement a method of performing, in a data protection (DP) application executed by a data protection server, policy-based data migration from a source to a destination using Mtree replication, and comprising:
   discovering source data organized into Mtrees on the source by querying the source and destination to receive valid credentials from each of the source and destination;
   creating an Mtree replication pair from the data protection application comprising the source and destination;
   configuring a policy to control the Mtree replication by validating source and destination connectivity before initiating the Mtree replication;
   monitoring the Mtree replication periodically to obtain a status of the Mtree replication; and
   checking, once the Mtree replication is complete, that there is no further source data to be migrated to the destination.

* * * * *